United States Patent [19]

Brec et al.

[11] 4,309,491
[45] Jan. 5, 1982

[54] ELECTRIC CELL WITH A NON-AQUEOUS ELECTROLYTE

[75] Inventors: Raymond Brec, Nantes; Alain Le Mehauté, Gif sur Yvette; Alain Dugast, Nantes, all of France

[73] Assignee: Societe Anonyme dite Compagnie Generale d'Electricite, Paris, France

[21] Appl. No.: 181,622

[22] Filed: Aug. 26, 1980

[30] Foreign Application Priority Data

Sep. 11, 1979 [FR] France .............................. 79 22644

[51] Int. Cl.³ ............................................ H01M 4/58
[52] U.S. Cl. .................................. 429/112; 429/193; 429/197; 429/218; 429/225
[58] Field of Search ............... 429/194, 195, 196, 197, 429/218, 225, 112, 193

[56] References Cited

U.S. PATENT DOCUMENTS 4,223,079  9/1980  Margolit et al. ............... 429/194
4,229,509 10/1980  Margalit .......................... 429/194

FOREIGN PATENT DOCUMENTS 2168866 9/1973 France .
2277898 2/1978 France .
2381395 9/1978 France .

OTHER PUBLICATIONS

Chemical Abstracts, vol. 89, No. 6, 7 Aug. 1978, p. 144, Abstract 46261b, Columbus, Ohio (U.S.A.).
Collection Czechoslov. Chem. Commun., vol. 33, No. 3, 1968, p. 683.

Primary Examiner—Donald L. Walton
Attorney, Agent, or Firm—Kenyon & Kenyon

[57] ABSTRACT

A secondary electric cell which includes: a non-aqueous electrolyte, a negative electrode whose active material includes at least one alkali metal in contact with the electrolyte, and a positive electrode whose active material is suitable for intercalating the active material of the negative electrode, wherein said positive electrode includes an active compound or solid solution whose general formula is $M_xX$, $R_yX_3$ where:
M is an element chosen from lead and tin;
R is an element chosen from bismuth and antimony; and
X is an element chosen from sulphur and selenium, with x having a value lying between 0 and 1 (inclusive), and y having a value lying between 0 and 2 (inclusive). Such cells may be used in watches or pacemakers.

11 Claims, 3 Drawing Figures

ELECTRIC CELL WITH A NON-AQUEOUS ELECTROLYTE

The present invention relates to an electric storage cell with a non-aqueous electrolyte, said electric cell having a negative electrode including at least one alkali metal, and a positive electrode including an active compound in a layer configuration.

BACKGROUND OF THE INVENTION

A number of investigations have been performed over the past few years on high energy density electric cells using positive electrodes that contain insertion compounds in which the negative active material is inserted during charging. The said negative active material is constituted by an alkali metal, in particular lithium. Such electric cells are described in particular in French Pat. No. 77 04 518 published under the No. 2 381 395.

Further, bismuth oxide $Bi_2O_3$ has also been recommended for use as a positive active material, as described in "Journal of the Electrochemical Society 1978, vol. 125 No. 1 p. 14" as has the use of compounds such as $Pb_2Bi_2O_5$ and $PbBi_2O_4$ as published in "The proceedings of the 11th International Power Sources Symposium No. 7, Brighton 1978", at page 623, published by Academic Press.

However, such compounds which allow high energy density to be obtained are not suitable for producing rechargeable, or secondary electric cells.

Preferred embodiments of the present invention remedy such drawbacks and produce a high energy density electric cell which is capable of undergoing a large number of charge/discharge cycles. Further, such an electric cell is not very expensive to produce.

SUMMARY OF THE INVENTION

The invention provides a secondary electric cell which includes: a non-aqueous electrolyte; a negative electrode whose active material includes at least one alkali metal in contact with the electrolyte; and a positive electrode whose active material is suitable for intercalating the active material of the negative electrode, wherein said positive electrode includes an active compound or solid solution whose general formula is $M_xX$, $R_yX_3$ where:
M is an element chosen from lead and tin;
R is an element chosen from bismuth and antimony; and
X is an element chosen from sulphur and selenium, with
  x having a value lying between 0 and 1 (inclusive), and y having a value lying between 0 and 2 (inclusive).

BRIEF DESCRIPTION OF THE DRAWINGS

Examples of the invention are described with reference to the accompanying drawings in which.

DETAILED DESCRIPTION

Figure 1:
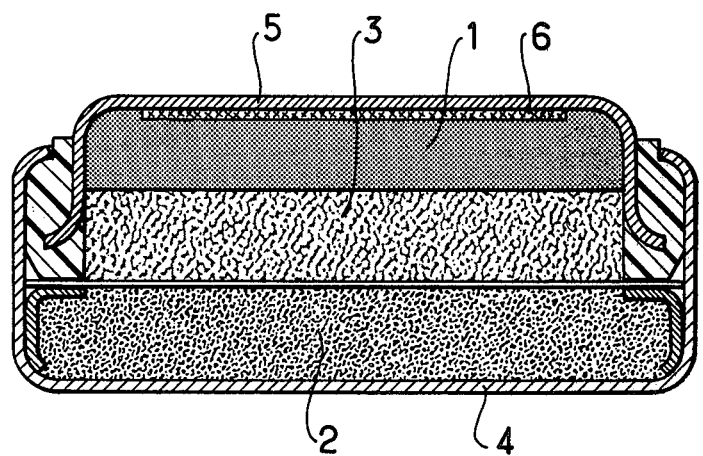
FIG. 1 is a cross-section through a button type electric cell in accordance with the invention.

An electric cell in accordance with the invention includes the following main components:

POSITIVE ELECTRODE

The active material of the positive electrode includes a compound whose general formula is the following:

$$M_xX, R_yX_3.$$

In the above formula:
M represents an element chosen from lead and tin;
R represents an element chosen from bismuth and antimony;
X is an element chosen from sulphur and selenium; and
x has a value lying between 0 and 1 (inclusive), while y has a value lying between 0 and 2 (inclusive).

By way of example, such compounds include $PbBi_2S_4$ and $SnBi_2S_4$.

Such an active material can be used alone if it is sufficiently conductive or, if not, it should be used in association with an electronically conductive support such as carbon, copper, nickel, zinc, silver or the like, together with a bonding agent such as polytetrafluoroethylene which can be used to consolidate the structure.

Said active material is deposited on the support or forms a porous texture by being compressed onto a collector.

Said active material can also be mixed with a conductive powder such as carbon, graphite or a mixture thereof.

Generally, the structure of the positive active material is in layers based on the Schoenflyes space group. These layers are interconnected by van der Waals forces. The individual layers form at least one sheet which contains metal atoms and is disposed between sheets of non-metal atoms. Insertion and de-insertion reactions take place between the layers and are made possible by the weakness of said van der Waals forces.

The speed of insertion and de-insertion (which corresponds to charging and discharging the electric cell) is considered to be an important factor for determining possibly appreciable concentration polarizations which may occur at the electrode during the electrochemical processes in presence of the compounds used as positive active materials.

The table hereinbelow gives a few parameters of an active compound in accordance with the invention, i.e. $PbBi_2S_4$, compared with already known compounds:

|  | d | m(g) | F/mole (primary) | Ah/kg | E (volts) | Wh/Kg | Wh/dm³ |
| --- | --- | --- | --- | --- | --- | --- | --- |
| $Bi_2S_3$ | 7.39 | 513.96 | 6 | 313.5 | 1.7 | 532.9 | 3938 |
| $PbBi_2S_4$ | 7.3 | 753.15 | 8 | 284.7 | 1.6 | 455.5 | 3325 |
| PbS | 7.5 | 239.25 | 2 | 224 | 1.5 | 336 | 2520 |

In the above table:
d is density;
m(g) is molar mass;
F/mole (primary) is the number of Faradays per mole of active compound discharged in a primary cell;
Ah/kg is the theoretical specific capacity;
E/(volts) is the initial voltage with respect to lithium;
Wh/kg is the energy density per unit weight;
Wh/dm³ is the energy density per unit volume.

NEGATIVE ELECTRODE

The negative electrode includes at least one alkali metal.

Said metal can be used alone, deposited on an electronically conductive support made, for example, of copper, steel, nickel, carbon or the like.

An alloy of said alkali metal may also be used, providing the alloy is electronically conductive and capable of electrochemically releasing ions which react with the positive active material.

By way of example, the negative electrode may be made of an alloy of lithium and aluminum thereby reducing the rate of dendrite formation and growth to a minimum during charging.

ELECTROLYTE

The electrolyte includes firstly a solvent which is chemically inert relative to the electrodes while allowing ions to migrate towards the electrodes, and secondly an ionisable salt dissolved in said solvent. Such a salt has the following general formula:

L Z where

L is a cation chosen from ions of alkali metals and Z is at least one anion chosen from halides, sulphates, nitrates, phosphofluorides, thiocyanates, perchlorates, hexafluorophosphates and hydrocarbons.

Particularly advantageous salts are lithium perchlorate, lithium hexafluorophosphate and lithium thiocyanate, ammonium iodide and ammonium hexafluoroarsenide, hydrochloric acid, potassium thiocyanate or chloride and magnesium chloride.

The solvents used are polar organic compounds such as esters, ethers, organic carbonates, organic lactones, amides or sulfoxides.

Such solvents may be used either alone or in a mixture. The concentration of ionisable salt in the solvent is determined by its conductivity and by its chemical reactivity. In general, concentrations of between 0.1 and 5 moles per liter are used.

It will also be noted that solid electrolytes such as beta alumina may be used. Likewise, molten alkaline halides are also suitable.

PRACTICAL EMBODIMENT

A practical embodiment of a button type electric cell in accordance with the invention will now be described with reference to FIG. 1.

FIG. 1 illustrates a button type electric cell with a negative active material 1, a positive active material 2 and a porous separator 3 which is impregnated with electrolyte. The positive collector 4 forms a cup, and the negative collector 5 forms a cap.

The positive active material 2 is compressed in the cup 4 under a load of 800 kg and under a dry nitrogen atmosphere.

The negative active material 1 is compressed in the cap 5 under an argon atmosphere. The separator 3 is of the cellulose type and is impregnated with electrolyte. After crimping, the electric cell thus constituted is discharged at 500 $\mu$A then recharged at the same current intensity.

A few examples of electric cells will now be given.

1st EXAMPLE

The compound $PbBi_2S_4$ was prepared by heating a mixture of PbS and $Bi_2S_3$ at about 700° C. for 2 weeks. A 1.5 M solution of butyl-lithium in hexane was made to react with said mixture and the result analysed to verify that lithium had been inserted in said compound. Then, 500 mg of the substance was compressed in the cup 4 to form a button type electric cell such as described hereinabove, but assembled in the discharged state. The capacity of said electric cell after charging was 100 rechargeable milliamp-hours.

2nd EXAMPLE

The compound $PbBi_2S_4$ was prepared by heating a mixture of PbS and $Bi_2S_3$ to about 700° C. for 1 week. The compound was then mixed with 15% by weight of a mixture of 70% graphite and 30% acetylene black. An electric cell such as described with reference to FIG. 1 was then made with said compound, using a bimolar solution of $LiClO_4$ in dioxalane as the electrolyte. The equivalent capacity of such an electric cell was 90 mAh for a cathode with a surface of 1.2 cm$^2$ and 1.6 mm thick.

Figure 2:
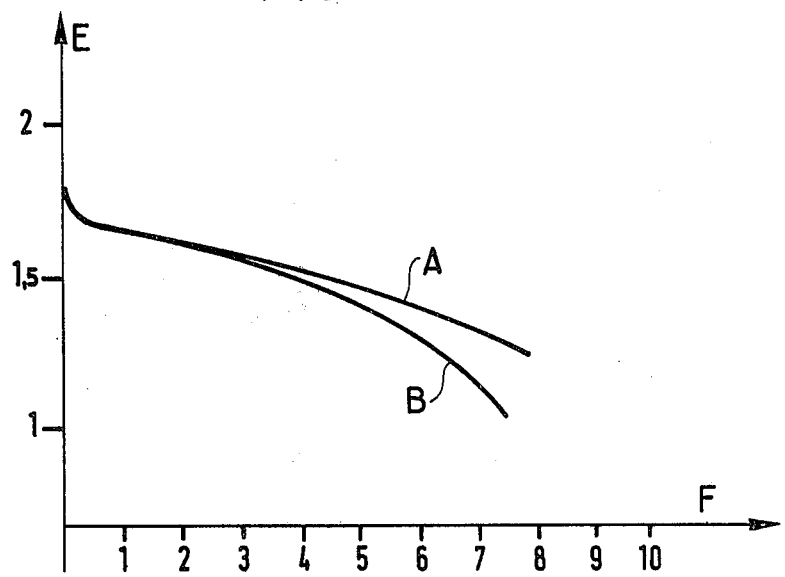
FIGS. 2 and 3 are graphs which illustrate the electrical performance of electric cells in accordance with the invention.

FIG. 2 shows the discharge curve of said electric cell at an intensity of 200 $\mu$A (curve A) and 500 $\mu$A (curve B). The voltage E in volts as a function of the number of F/mole is plotted along the X-axis.

Figure 3:
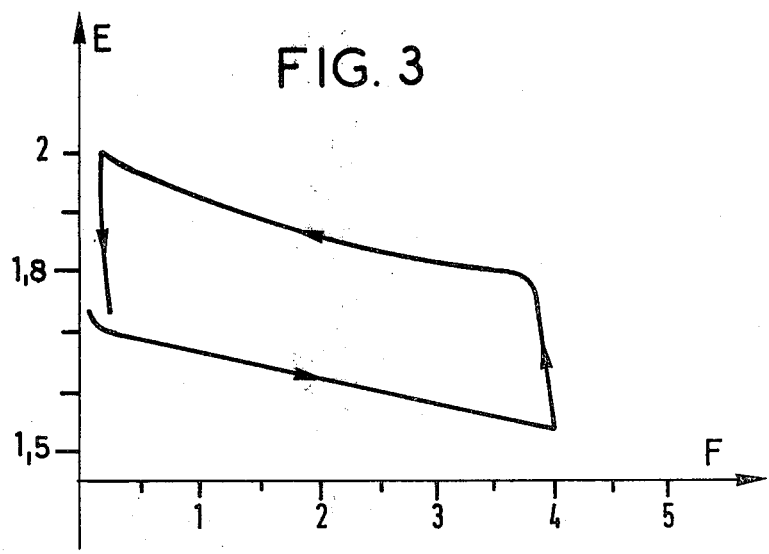

FIG. 3 shows the cycle curve of such an electric cell, namely, the voltage E in volts as a function of the number of F/mole.

Such an electric cell has an energy-to-weight ratio of about 1500 Wh/kg which is reversible.

The invention may advantageously be used in electric cells for watches, pacemakers and the like.

We claim:

1. A secondary electric cell which includes: a non-aqueous electrolyte; a negative electrode whose active material includes at least one alkali metal in contact with the electrolyte, and a positive electrode whose active material is suitable for intercalating the active material of the negative electrode, wherein said positive electrode includes an active compound or solid solution whose general formula is $M_xX$, $R_yX_3$ where:

M is an element chosen from the group consisting of lead and tin;

R is an element chosen from the group consisting of bismuth and antimony; and

X is an element chosen from the group consisting of sulphur and selenium, with x having a value lying between 0 and 1 (inclusive), and y having a value lying between 0 and 2 (inclusive).

2. An electric cell according to claim 1, wherein said active compound is chosen from the group consisting of $PbBi_2S_4$ and $SnBi_2S_4$.

3. An electric cell according to claim 1, wherein said compound is associated with an electronically conductive support.

4. An electric cell according to claim 1, wherein said compound is mixed with a conductive powder which includes a substance chosen from the group consisting of acetylene black, graphite and mixtures thereof.

5. An electric cell according to claim 1, wherein said electrolyte includes at least one ionisable salt dissolved in a solvent in a concentration lying between 0.1 and 5 moles per liter.

6. An electric cell according to claim 5, wherein said ionisable salt has a general formula of LZ, wherein L is a cation chosen from the ions of the group consisting of alkali metals, and Z is an anion chosen from the group consisting of halides, sulphates, nitrates, phosphofluorides, thiocyanates, perchlorates, hexafluorophosphates and hydroborides.

7. An electric cell according to claim 5 or 6, wherein said solvent includes an organic compound chosen from the group consisting of esters, ethers, organic carbonates, organic lactones, amides, sulfoxides and mixtures thereof.

8. An electric cell according to claim 1, 2 or 3, wherein said electrolyte is a solid electrolyte.

9. An electric cell according to claim 1, 2 or 3, wherein said electrolyte is a molten salt.

10. An electric cell according to claim 8, wherein said solid electrolyte comprises beta alumina fitted to the metal of the negative electrode.

11. An electric cell according to claim 9, wherein said molten salt comprises at least one alkali halide.

* * * * *